United States Patent [19]

Takai

[11] Patent Number: 5,056,113
[45] Date of Patent: Oct. 8, 1991

[54] DATA COMMUNICATION SYSTEM

[75] Inventor: Mamoru Takai, Osaka, Japan

[73] Assignee: Megasoft Inc., Suita, Japan

[21] Appl. No.: 410,206

[22] Filed: Sep. 21, 1989

[30] Foreign Application Priority Data

Sep. 22, 1988 [JP] Japan .................................. 63-238370

[51] Int. Cl.$^5$ ............................................. H04B 15/00
[52] U.S. Cl. ........................................ 375/58; 375/121
[58] Field of Search .................... 375/58, 75, 36, 121;
370/91, 107; 358/261.1; 371/32, 33, 34;
340/825.5; 178/69 R

[56] References Cited

U.S. PATENT DOCUMENTS

| | | | |
|---|---|---|---|
| 4,121,259 | 10/1978 | Preuss et al. ...................... | 358/261.1 |
| 4,360,840 | 11/1982 | Wolfrum et al. .................. | 358/261.1 |
| 4,622,685 | 11/1986 | Dhawan et al. .................... | 375/121 |
| 4,626,829 | 12/1986 | Hauck ................................. | 358/261.1 |
| 4,736,394 | 4/1988 | Giovannelli et al. ............. | 340/825.5 |
| 4,791,653 | 12/1988 | McFarland et al. ................ | 370/107 |
| 4,805,194 | 2/1989 | Wesolowski ......................... | 370/91 |
| 4,884,287 | 11/1989 | Jones et al. ......................... | 375/121 |

Primary Examiner—Stephen Chin
Attorney, Agent, or Firm—Lowe, Price, LeBlanc and Becker

[57] ABSTRACT

A data communication system between computers comprises communication paths composed of m transmission lines between the computers. Data and data to be transferred is coded based on a coding table. Each code comprises a series or string of figures. Each figure has a numeric value not over the m-th power of 2. Also, those adjacent figures in each code string have necessarily different values. Coded data is transmitted figure by figure through m transmission lines. Since values of each figure in a code necessarily differ, a timing signal is not required.

20 Claims, 4 Drawing Sheets

FIG. 4

DATA COMMUNICATION SYSTEM

BACKGROUND OF THE INVENTION

The present invention relates to a data communication system, and particularly to such a system capable of high speed and requiring fewer communication lines.

Hitherto, data communication between sender and receiver, used a communication path such as RS-232C. Then the data communication between sender and receiver is carried out by sending not only original data, but also data indicating the beginning and the end of the original data, and control signals such as ready or not-ready.

This addition of data indicating the beginning and the end of the original data, causes the total data to be transmitted to become long. Also, the requirement to send control data such as ready, not-ready, or strobe, results in a need for more communication paths than that necessary if only the original data were sent. In the case of RS-232C, since it was necessary to make the pace with its ruled baud rate, it was not possible to make a CPU exhibit its improved capability in processing speed sufficiently.

SUMMARY OF THE INVENTION

It is a purpose of the present invention to offer a data communication system through which the abovementioned problems are to be solved.

Devices communicate data via m parallel transmission lines. Original data is encoded using a coding table. Each unit of original data is encoded into a string of numeric figures. The maximum value of any figure is 2 to the power of m. This allows transmission of each numeric figure as m bits with each of the m bits transmitted simultaneously via the m parallel transmission lines. Also, adjacent figures in each code string must be different. This reduces the amount of overhead data, for example by eliminating the need for sending extra signals for timing purposes.

The data communication system in accordance with the present invention, is characterized in that, first communication path comprises a plural number of bits of m for sending data from one sender/receiver to other sender/receiver and also second communication path comprises a plural number of bits of m for sending data from the latter sender/receiver to the former sender/receiver are provided, coding tables consisting of a set of codes corresponding to original data to be sent and received each of which comprises in bits, are stored in memories provided respectively in both sender/receivers, each numeric figure in each code having a value not over m-th power of 2, and values at adjacent figure positions are necessarily different, at sender side, the original data to be sent are coded based on the coding table and sent out through the first or the second communication path to receiver side, at the receiver side, received coded data are decoded based on the coding table, wherein by receiving every one figure of the coded code, in order to inform reception of the one figure of the coded code to the sender side, the receiver side change acknowledging number comprising one figure having a value not over m-th power of 2, which is send back through the first or the second communication path to the sender side, in every successive sequence and the sender side sends next one figure of coded code after acknowledging the change of the acknowledging number sent from the receiver side, then the receiver side takes in the next one figure of coded code after acknowledging change of the coded code sent from the sender side.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION

In the following, referring to the drawings, a data communication system embodying the present invention is described.

Figure 1:
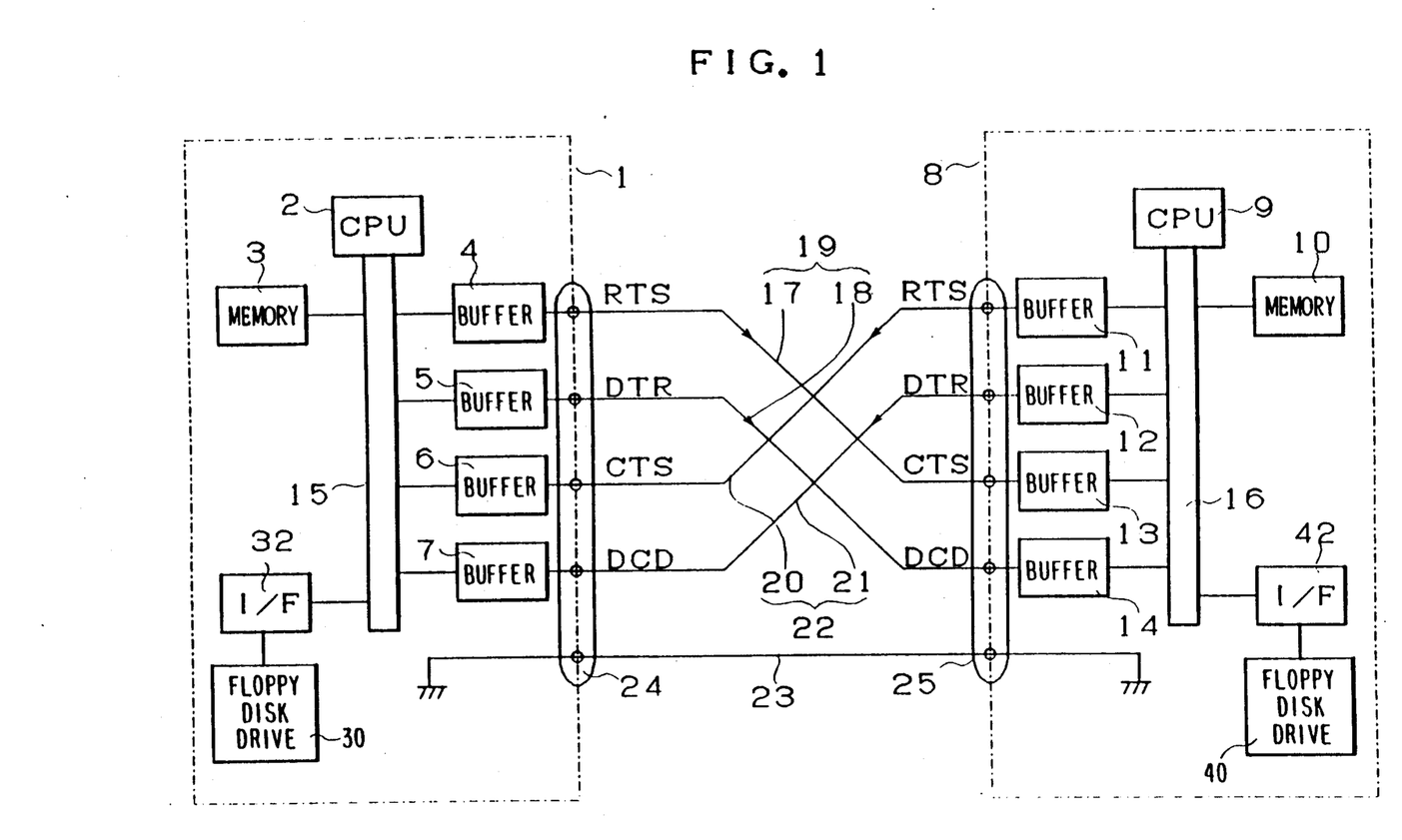
FIG. 1 is a circuit diagram showing a data communication system in accordance with an embodiment of the present invention in a simplified manner.

FIG. 1 is a circuit diagram showing the data communication system in accordance with an embodiment of the present invention in a simplified manner.

OUTLINE OF CONSTITUTION AND OPERATION

A sender/receiver 1 comprises a personal computer or the like, and it is provided with a CPU 2, a memory 3, buffers 4 and 5 for data-sending, for example for RTS or DTR use, buffers 6 and 7 for data-receiving, for example for CTS or DCD use, and an RS-232C terminal connector 24. A sender/receiver 8 also comprises a personal computer or the like and is provided with a CPU 9, a memory 10, buffers 11 and 12 for data-sending, for example for RTS or DTR use, buffers 13 and 14 for data-receiving, for example for CTS or DCD use, and an RS-232C terminal connector 25. While in this embodiment, the terminals RTS, DTR, CTS and DCD for RS-232C are used, the terminals are not used in accordance with the standard of RS-232C. Also, the present invention can be applied to any communication path other than RS-232C.

The CPU 2, the memory 3, buffers 4, 5, 6, and 7 are all mutually connected through a bus 15. Also the CPU 9, the memory 10, buffers 11, 12, 13, and 14 are all mutually connected through a bus 16. Buffers 4, 5, 6, 7 and buffers 11, 12, 13, 14 comprise I/O ports and others. Buffers 4 and 13 as well as buffers 5 and 14 are respectively connected through the RS-232C terminal connector 24, a 2-bit communication path 19 composed of data lines 17 and 18, and the RS-232C terminal connector 25. Also, buffers 6 and 11 as well as buffers 7 and 12 are respectively connected through the RS-232C terminal connector 24, a 2-bit communication path 22 composed of data lines 20 and 21, and the RS-232C terminal connector 25.

In this embodiment, data to be sent are stored in a floppy disk, then the personal computer 1 at the sender side reads a first 1 byte (8 bits) out of data to be sent from a floppy disk drive 30 into a buffer of the CPU 2.

Those data to be sent (called original data) which were read into the CPU 2 are coded in accordance with a coding table stored in the memory 3. The CPU sends out those coded data with one figure at a time through the communication path 19 to the CPU 9.

The CPU 9 which received the coded data decodes those coded data into the original data in accordance with a coding table (the same table as that in the sender side). Those decoded data are sent to a floppy disk drive 40 through an interface 42 and recorded on a floppy disk.

As has been described above, data of an amount of 1 byte are transferred. Data of second byte as well as those data following this second byte are transferred similarly.

Besides the above, in the actual data transfer operation, it is necessary to confirm the waiting state or the receiving completion state at the receiver side as well as the sending completion state at the sender side. In this invention, by devising the coding scheme, the confirmation can be carried out without requiring to add any new transmission line. Furthermore it can make the operation even faster. Therefore, before describing the detailed operation of the communication, detail of the coding is described below.

CODING

In this embodiment, one byte of original data to be sent and received is composed of 8 bits (n=8). Accordingly, the number of possible different values of original data is $2^8$, i.e. 256 values from 0 to 255. In FIG. 1, since the communication path is composed of 2 parallel lines 19 and 22 (m=2) simultaneously carrying 2 bits, each digit of coding codes is a number of a scale of the 2-nd power of 2, that is, $2^2=4$ different numbers starting from 0, i.e., 0, 1, 2, 3. When constructing the coding table, considerations must be paid on the following points:

Original data and coded codes must have a one-to-one correspondence.

In each code string, adjacent figures have different numeric values. By this, sending of the succeeding data can be recognized. Consequently, control signal such as the strobe signal is not required at the receiver side.

Each code string starts with a heading number. In this embodiment, the predetermined heading number is "1", and it must appear as the first figure.

Upon the reception of coded codes at the receiver side, in order to inform the readiness of the reception, as the receiving-ready number and at the same time as a second number other than the above heading number, in this embodiment, a number "3" is sent back to the sender side.

When the sender side and the receiver side are changed with each other and if "3" were designated for the last figure of the coded code the sender side might confuse "3" which is the last figure of the code string, with the receiving-ready number 3. For preventing this confusion, the last figure of the coded code should be a third number (ending number) which is a number other than the heading number and the receiving-ready number. In this embodiment, "0" or "2" is designated for the ending number. By this, it becomes possible to distinguish the ending number from the heading number or from the receiving-ready number, and hence the next following data can be transferred immediately after the end of the transfer of the present data.

Further, short coded codes must be assigned to those original data having high occurrence frequencies. By this, high-speed data transfer is possible. In general, in case where each coded code has different figure long in serial data transfer, a signal for showing the last figure of the coded code is necessary. However, in the present invention, the signal for showing the last figure of the coded code is not necessary, by devising the coding table as follows:

One code string for an original datum having high occurrence frequencies, is for example "120". Code strings for original data having lower occurrence frequencies, do not start with "120" irrespective of the total figure number in the coding table in the present invention. Therefore, the receiving side having the code table can find the end of code string immediately on receiving "120". Above mentioned relation is kept in all coded codes.

An example of the coding table constructed based on the above-described points of consideration is shown in TABLE 1.

TABLE 1

| Coding Table | |
|---|---|
| Origin. Data | Coded Code |
| 0 | 120 |
| 1 | 1010 |
| 2 | 1210 |
| 3 | 1310 |
| 4 | 10120 |
| 5 | 10320 |
| 6 | 12120 |
| 7 | 12320 |
| 8 | 13020 |
| 9 | 13120 |
| 10 | 102020 |
| 11 | 102010 |
| 12 | 102012 |
| 13 | 102030 |
| 14 | 102032 |
| 15 | 102102 |
| 16 | 102120 |
| 17 | 102130 |
| 18 | 102132 |
| 19 | 102302 |
| 20 | 102320 |
| 21 | 102310 |
| 22 | 102312 |
| 23 | 101210 |
| 24 | 101212 |
| 25 | 101230 |
| 26 | 101232 |
| 27 | 101302 |
| 28 | 101320 |
| 29 | 101310 |
| 30 | 101312 |
| 31 | 103020 |
| 32 | 103010 |
| 33 | 103012 |
| 34 | 103030 |
| 35 | 103032 |
| 36 | 103210 |
| 37 | 103212 |
| 38 | 103230 |
| 39 | 103232 |
| 40 | 103102 |
| 41 | 103120 |
| 42 | 103130 |
| 43 | 103132 |
| 44 | 121210 |
| 45 | 121212 |
| 46 | 121230 |
| 47 | 121232 |
| 48 | 121302 |
| 49 | 121320 |
| 50 | 121310 |
| 51 | 121312 |

TABLE 1-continued

Coding Table

| Origin. Data | Coded Code |
|---|---|
| 52 | 123020 |
| 53 | 123010 |
| 54 | 123012 |
| 55 | 123030 |
| 56 | 123032 |
| 57 | 123210 |
| 58 | 123212 |
| 59 | 123230 |
| 60 | 123232 |
| 61 | 123102 |
| 62 | 123120 |
| 63 | 123130 |
| 64 | 123132 |
| 65 | 130210 |
| 66 | 130210 |
| 67 | 130230 |
| 68 | 130232 |
| 69 | 130102 |
| 70 | 130120 |
| 71 | 130130 |
| 72 | 130132 |
| 73 | 130302 |
| 74 | 130320 |
| 75 | 130310 |
| 76 | 130312 |
| 77 | 132020 |
| 78 | 132010 |
| 79 | 132012 |
| 80 | 132030 |
| 81 | 132032 |
| 82 | 132102 |
| 83 | 132120 |
| 84 | 132130 |
| 85 | 132132 |
| 86 | 132302 |
| 87 | 132320 |
| 88 | 132310 |
| 89 | 132312 |
| 90 | 131210 |
| 91 | 131212 |
| 92 | 131230 |
| 93 | 131232 |
| 94 | 131302 |
| 95 | 131320 |
| 96 | 131310 |
| 97 | 131312 |
| 98 | 1020210 |
| 99 | 1020212 |
| 100 | 1020230 |
| 101 | 1020232 |
| 102 | 1020130 |
| 103 | 1020132 |
| 104 | 1020310 |
| 105 | 1020312 |
| 106 | 1021010 |
| 107 | 1021012 |
| 108 | 1021030 |
| 109 | 1021032 |
| 110 | 1021210 |
| 111 | 1021212 |
| 112 | 1021230 |
| 113 | 1021232 |
| 114 | 1011310 |
| 115 | 1021312 |
| 116 | 1023010 |
| 117 | 1023012 |
| 118 | 1023030 |
| 119 | 1023032 |
| 120 | 1023210 |
| 121 | 1023212 |
| 122 | 1023230 |
| 123 | 1023232 |
| 124 | 1023130 |
| 125 | 1023132 |
| 126 | 1012130 |
| 127 | 1012132 |
| 128 | 1012310 |
| 129 | 1012312 |
| 130 | 1013010 |
| 131 | 1013012 |
| 132 | 1013030 |
| 133 | 1013032 |
| 134 | 1013210 |
| 135 | 1013212 |
| 136 | 1013230 |
| 137 | 1013232 |
| 138 | 1013130 |
| 139 | 1013132 |
| 140 | 1030210 |
| 141 | 1030212 |
| 142 | 1030230 |
| 143 | 1030232 |
| 144 | 1030130 |
| 145 | 1030132 |
| 146 | 1030310 |
| 147 | 1030312 |
| 148 | 1032130 |
| 149 | 1032132 |
| 150 | 1032310 |
| 151 | 1032312 |
| 152 | 1031010 |
| 153 | 1031012 |
| 154 | 1031030 |
| 155 | 1031032 |
| 156 | 1031210 |
| 157 | 1031212 |
| 158 | 1031230 |
| 159 | 1031232 |
| 160 | 1031310 |
| 161 | 1031312 |
| 162 | 1212130 |
| 163 | 1212132 |
| 164 | 1212310 |
| 165 | 1212312 |
| 166 | 1213010 |
| 167 | 1213012 |
| 168 | 1213030 |
| 169 | 1213032 |
| 170 | 1213210 |
| 171 | 1213212 |
| 172 | 1213230 |
| 173 | 1213232 |
| 174 | 1213130 |
| 175 | 1213132 |
| 176 | 1230210 |
| 177 | 1230212 |
| 178 | 1230230 |
| 179 | 1230232 |
| 180 | 1230130 |
| 181 | 1230132 |
| 182 | 1230310 |
| 183 | 1230312 |
| 184 | 1232130 |
| 185 | 1232132 |
| 186 | 1232310 |
| 187 | 1232312 |
| 188 | 1231010 |
| 189 | 1231012 |
| 190 | 1231030 |
| 191 | 1231032 |
| 192 | 1231210 |
| 193 | 1231212 |
| 194 | 1231230 |
| 195 | 1231232 |
| 196 | 1231310 |
| 197 | 1231312 |
| 198 | 1302130 |
| 199 | 1302132 |
| 200 | 1302310 |
| 201 | 1302312 |
| 202 | 1301010 |
| 203 | 1301012 |
| 204 | 1301030 |
| 205 | 1301032 |
| 206 | 1301210 |
| 207 | 1301212 |

TABLE 1-continued

Coding Table

| Origin. Data | Coded Code |
|---|---|
| 208 | 1301230 |
| 209 | 1301232 |
| 210 | 1301310 |
| 211 | 1301312 |
| 212 | 1303010 |
| 213 | 1303012 |
| 214 | 1303030 |
| 215 | 1303032 |
| 216 | 1303210 |
| 217 | 1303212 |
| 218 | 1303230 |
| 219 | 1303232 |
| 220 | 1303130 |
| 221 | 1303132 |
| 222 | 1320210 |
| 223 | 1320212 |
| 224 | 1320230 |
| 225 | 1320232 |
| 226 | 1320130 |
| 227 | 1320132 |
| 228 | 1320310 |
| 229 | 1320312 |
| 230 | 1321010 |
| 231 | 1321012 |
| 232 | 1321030 |
| 233 | 1321032 |
| 234 | 1321210 |
| 235 | 1321212 |
| 236 | 1321230 |
| 237 | 1321232 |
| 238 | 1321310 |
| 239 | 1321312 |
| 240 | 1323010 |
| 241 | 1323012 |
| 242 | 1323030 |
| 243 | 1323032 |
| 244 | 1323210 |
| 245 | 1323212 |
| 246 | 1323230 |
| 247 | 1323232 |
| 248 | 1323130 |
| 249 | 1323132 |
| 250 | 1312130 |
| 251 | 1312132 |
| 252 | 1312310 |
| 253 | 1312312 |
| 254 | 1313010 |
| 255 | 1313012 |

This coding table is stored in the memory 3 as well as in the memory 4.

Upon the reception of coded codes at the receiver side, "3" is sent out to the sender as described before. And every time the receiver receives every one digit of coded codes, receiver side sends back the acknowledging number which is a third number other than the above first and second numbers, that is "0" or "2" in this working example, alternatively in every successive sequence.

By this coding table with the receiving-ready number as well as the acknowledging number, any addition of data for indicating the beginning and the end of original data becomes unnecessary. Hence, control signals indicating states such as ready, not-ready, strobe, etc. become unnecessary. As a result of this, the communication path can be simplified. Furthermore, CPU 2 and CPU 9 can exhibit their high-speed capability, thereby a high-speed data communication without errors can be achieved.

By the normal use of a conventional RS-232C terminal, up to an order of 9600 baud could usually be achieved, whereas by the present data communication system, using the RS-232C terminals 24 and 25 and providing a special wiring to the communication path 19 as well as to the communication path 22, communication speeds of 40,000–80,000 baud can be achieved so far.

DETAIL OF THE DATA COMMUNICATION

Figure 2:
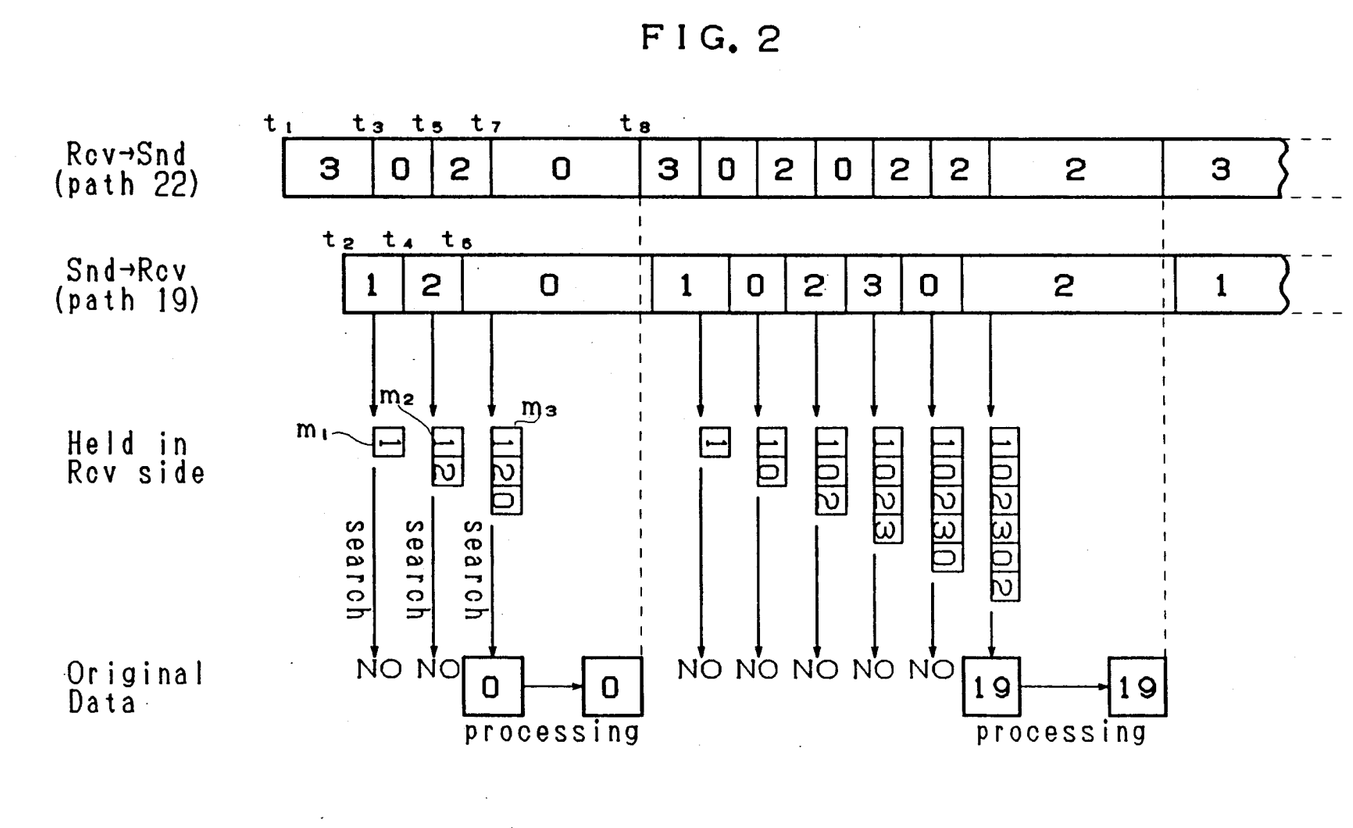
FIG. 2 is a data chart between sender side and receiver side.
Figure 3:
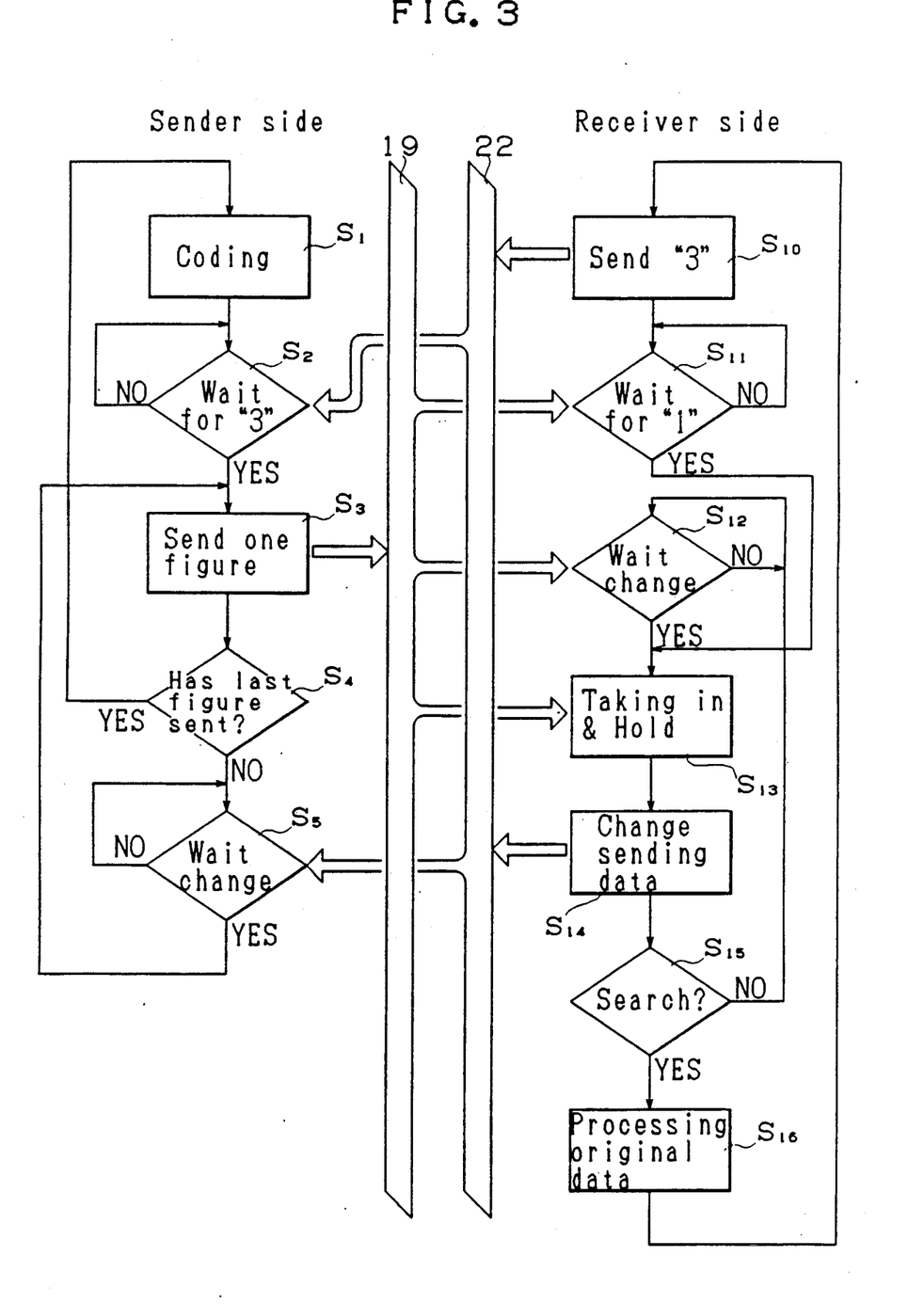
FIG. 3 is a flowchart of data transfer.

Referring to FIGS. 1, 2 and 3, the data communication between the sender/receiver 1 and the sender/receiver 8, is described hereafter. FIG. 2 shows the change of data transferred between the sender/receiver 1 and sender/receiver 8. FIG. 3 shows the flow-chart of the data communication. In FIG. 2, "Rcv to Snd" shows change of data on the communication path 19 from sender side to receiver side. "Snd to Rcv" shows change of data on the communication path 22 from receiver side to sender side. "Held in Rcv side" shows data held in CPU of the receiver side. "Original data" shows restored original data.

A case where original data $(0)_{10}$, $(19)_{10}$... in decimal (00000000, 00010011... in binary) are transferred from the sender/receiver 1 to sender/receiver 8, is described below. First, the CPU 2 of sender side 1 codes $(0)_{10}$ in accordance with the table 1 and obtains coding code or string "120" (S1 of FIG. 3). Next, the CPU 2 checks whether the receiver side 8 is in receiving-ready state or not (S2 of FIG. 3). When the receiver side 8 is ready for receiving, the CPU 9 of receiver side 8 outputs "3" as a receiving-ready number on the bus 16, the buffers 11 and 12 and communication path 22 (t1 of FIG. 2, S10 of FIG. 3), that is, the receiver side 8 makes H states of RTS terminal and DTR terminal. Therefore, RTS terminal and DTR terminal of sender side 1 becomes H state, i.e. "3". CPU 2 of sender side 1 knows that the receiver side 8 is ready for receiving, by receiving the "3" as a receiving-ready number (S2 of FIG. 3) and then send first figure "1" of the code string on the communication path 19 (t2 of FIG. 2 and S3 of FIG. 3). In other words, CPU 2 applies L state to the RTS terminal of sender side 1 and makes H state to the RTS terminal of sender side 1. Therefore, in the receiver side 8 CTS terminal becomes L state and DCD terminal becomes H state. In other words, "1" is transferred through the path, CPU 2→the bus 15→the buffers 4 and 5→the terminal 24 of RS-232C→the communication path 19→the terminal 25 of RS-232C→the buffers 13 and 14→the bus 16→the CPU 9.

As has been described above, the code string must be started from "1" as the heading number. Therefore, the CPU 9 of receiver side 8 knows the first figure of the code string by receiving the "1" through the communication path 19 (t2 of FIG. 2, S11 of FIG. 3). The CPU 9 takes in the "1" (m1 of FIG. 2, S13 of FIG. 3). After complete reception, the CPU 9 transfers "0", i.e. RTS=L and DTR=L, through the path 19 (t3 of FIG. 2, S14 of FIG. 3). Next, the CPU 9 of receiver side 8 searches whether the code "1" exists in the table or not (S15 of FIG. 3). Because there is not code of "1" in the table, the step S12 is carried out.

On the other hand, the CPU 2 of sender side 1 knows that the receiver side 8 takes "1" by watching the change of the data on path 19 from "3" to "0" (S5 of FIG. 3) and then sends the next figure "2" (RTS=H, DTR=L) of the code string (t4 of FIG. 2, S3 of FIG. 3). The CPU 9 of receiver side 8 knows that next data is transferred by watching the change of data of the path 19 from "1" to "2" (S12 of FIG. 3). The CPU 9 takes in "2" from the path 19 (S13 of FIG. 3) and transfers to "2" on the path 22 (t5 of FIG. 2, S14 of FIG. 3). The CPU 9 of receiver side 8 stores the "12" combination of the former taken code "1" and the present taken code "2" (m2 of FIG. 2). The CPU 9 searches the table and determines whether the code "12" exists in the table or not (S15 of FIG. 3). Because there is no code of "12" in the table, the step S12 is carried out.

The CPU 2 of sender side 1 knows that the receiver side 8 takes "2" by watching the change of the data on path 19 from "0" to "2" (S5 of FIG. 3) and then sends next figure "0" (RTS=L, DTR=L) of the code string (t6 of FIG. 2, S3 of FIG. 3). The CPU 9 of receiver side 8 knows that next data is transferred by watching the change of data on the path 19 from "2" to "0" (S12 of FIG. 3). The CPU 9 takes in "0" from the path 19 (S13 of FIG. 3) and transferred to "0" on the path 22 (t7 of FIG. 2, S14 of FIG. 3). The CPU 9 of receiver side 8 stores the "120" combination of the former taken code "12" with the present taken code "0" (m3 of FIG. 2). The CPU 9 searches and determines whether the code "120" exists in the table or not (S15 of FIG. 3). Because the code string "120" is corresponds to original datum $(0)_{10}$, the original datum $(0)_{10}$ is obtained (See Table 1).

As has been described above, there is no code starting from "120" other than the code corresponding to the original datum of $(0)_{10}$. Therefore, the receiver side 8 knows that the "0" is last figure of the coded code by receiving the "0" of code "120". The end of a one group of code can be easily known without any signal for showing the end of code in the present invention.

Next, the CPU 9 processes the obtained original data $(0)_{10}$, for example CPU 9 stores the data in the memory 10 or outputs the data to the FDD 40 (S16 of FIG. 3). After completing the processing, CPU 9 transfers "3" as receiving-ready number through the path 22 (t8 of FIG. 2, S10 of FIG. 3).

On the other hand, CPU 2 carries out the step S1 through the step S4, after sending the last figure "0" of the coded code "012". In the step S1, the CPU 2 codes the next original data of $(19)_{10}$ in accordance with the table 1 and obtains code string "102302". The CPU 2 starts the data transfer, after receiving "3" from the receiver side 8 (S2 of FIG. 3). The data transfer is carried out in the above mentioned manner. Thus a high speed data communication can be achieved.

Figure 4:
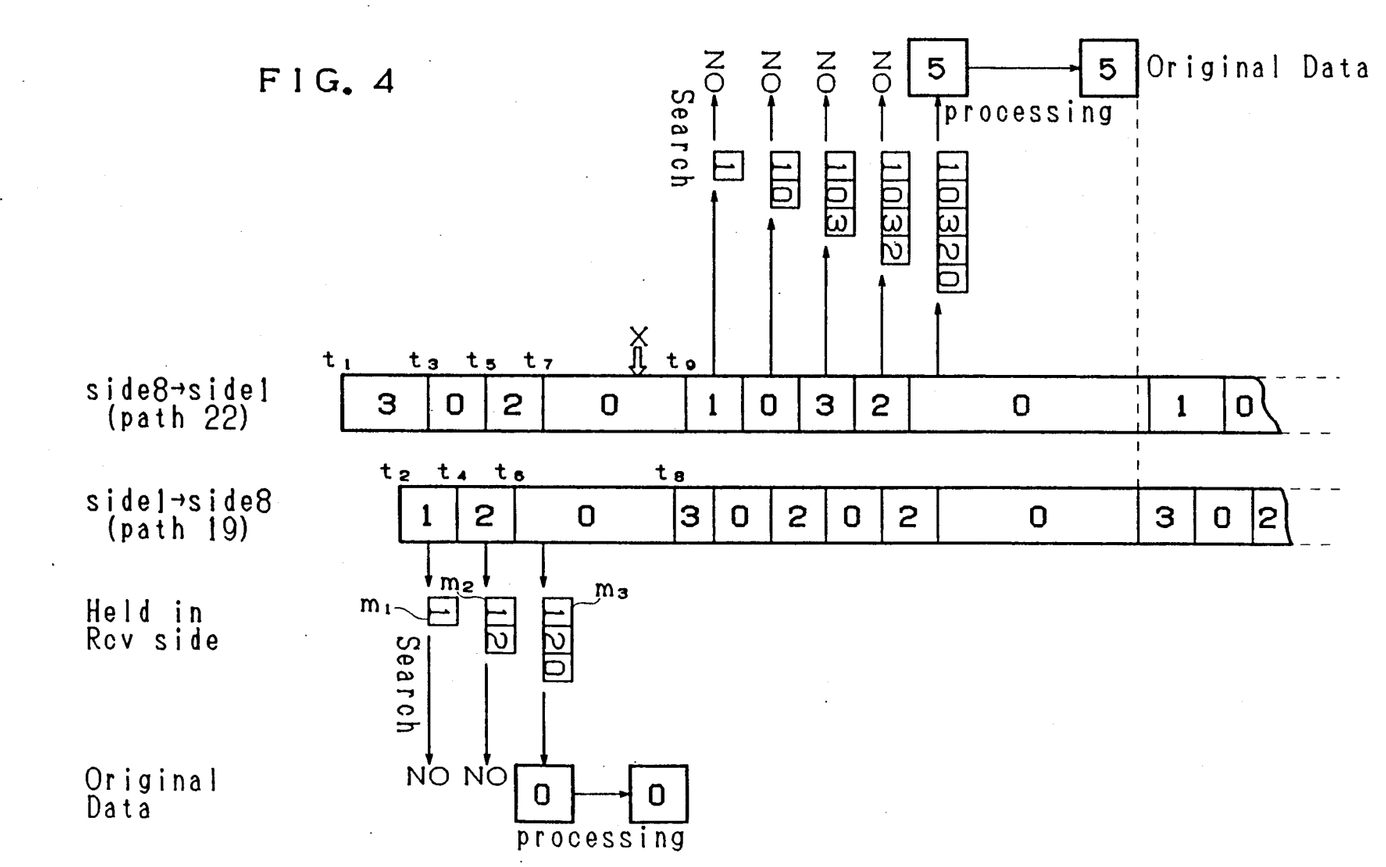
FIG. 4 is a data chart between sender side and receiver side in case of changing the sender side and the receiver side with each other.

There are some cases of inversing the sender side and receiver side with each other in carrying out the communication. FIG. 4 shows the data communication in this case. First, the data $(0)_{10}$ is transferred from the sender/receiver 1 to the sender/receiver 8. After transferring the data $(0)_{10}$, the sender side and the receiver side exchange functions with each other at time X. In other words, the sender/receiver 8 sends data to the sender/receiver 1 after the time X. The sender 8 starts the transferring after receiving the receiving-ready signal "3". At the time X, the path 19 shows "0" which is the last figure of the coded code. The sender 8 starts to transfer data (t9 of FIG. 4), after changing the data on the path 19 from "0" to "3" (t8 of FIG. 4). Subsequent data communication is carried out as described above. By designating the value of the last figure of the code string as a value other than the receiving-ready number "3", the error operation can be prevented even in case of changing the receiver side and sender side with each other.

While in the above mentioned embodiment the coding is carried out one by one, the coding may be carried out together and memorized.

Hereupon, although in the above embodiment, the bit number n of data to be sent has been selected to be 8, it can also be applied to the case of other bit number. The number of transmission path, m, can also be selected arbitrarily.

As has been described above in detail, in the data communication system in accordance with the present invention, provides coding tables comprised of code strings in which each figure has a value not greater than the m-th power of 2. Also those values at adjacent figures are necessarily different. The receiver side sends the acknowledging number back to the sender side upon receiving every one figure of a code string. The sender side sends the next figure of a coded string after receiving the acknowledging number, and the receiver side takes in the next figure of a code string each after acknowledgment. Accordingly, control signals such as clock signal and strobe signal are not required any more, and also the number of communication path can be reduced.

Moreover, in the data communication system in accordance with the present invention, the first figure of each code string is designated to be a predetermined heading number. Therefore, each first figure is recognized as the head of code, hence synchronization to the head of each codes can be attained easily. Thus, since the code strings represent not only data themselves but also head figures thereof, it becomes not unnecessary to add any extra data for indicating the beginning of codes.

Furthermore, in the data communication system in accordance with the present invention, at the receiver side, upon the reception of coded codes, in order to inform the readiness of reception to the sender side, the receiving-ready number is sent to the sender side through the communication path. Thus the coded codes can be sent with a high reliability.

Furthermore, in the data communication system in accordance with the present invention, the last figure of each code string a predetermined ending number other than the acknowledging number and the receiving-ready number. Therefore, errors can be prevented even in case of changing the receiver side operations and sender side with each other.

Moreover, in the data communication system in accordance with the present invention, for those original data having high occurrence frequencies, short coded data are assigned, thereby still faster data communication becomes possible. Further, because values from head figure to P-th figure of a string having P figures are not the same as the head figure to P-th figure of any other string having Q figures longer than the P figure string, the end of a short code string can be known. Therefore, no signal for showing end of coded code strings is necessary even when using variable length coded code.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A method of communicating data between a sending device and a receiving device via a plurality of m parallel data lines, said method comprising:

encoding each value of original data into a string of numeric code figures, wherein each figure in each code string has a value not greater than 2 to the power m such that when expressed in binary, each figure comprises m bits, and adjacent figures in each code string have different numeric values;

transmitting each figure of encoded data from the sender to the receiver by simultaneously transmitting one of the m bits of each figure on each of the m parallel data lines;

receiving the transmitted data on the m parallel data lines at the receiver; and decoding strings of code figures to recover the original data.

2. A method of communicating data as in claim 1 further comprising:

upon decoding each value of original data, sending a specified acknowledging number from the receiver back to the sender, wherein the specified acknowledging number has a value not greater than 2 to the power m; and when the sender receives the acknowledging number the sender encodes and transmits a subsequent value of original data.

3. A method of communicating data as in claim 1 wherein the code string for each possible value of original data begins with a predetermined heading value.

4. A method of communicating data as in claim 1 further comprising:

said receiver transmitting a specific numeric value not greater than 2 to the power m back to the sender to indicate readiness to receive.

5. A method of communicating data as in claim 3 further comprising:

said receiver transmitting a specific numeric value not greater than 2 to the power m back to the sender to indicate readiness to receive, wherein the specific value indicating readiness to receive is different from said predetermined heading value.

6. A method of communicating data between a sending device and a receiving device via a plurality of m parallel data lines, said method comprising:

encoding each value of original data into a string of numeric code figures, wherein each figure in each code string has a value not greater than 2 to the power m such that when expressed in binary, each figure comprises m bits, and adjacent figures in each code string have different numeric values;

transmitting each figure of encoded data from the sender to the receiver by simultaneously transmitting one the m bits of each figure on each of the m parallel data lines;

receiving the transmitted data on the m parallel data lines at the receiver; and decoding the strings of code figures to recover the original data;

upon decoding each value of original data, sending a specified acknowledging number from the receiver back to the sender, wherein the specified acknowledging number has a value not greater than 2 to the power m; and when the sender receives the acknowledging number the sender encodes and transmits a subsequent value of original data;

wherein the code string for each possible value of original data begins with a predetermined heading value; and wherein the code string for each possible value of original data ends with a predetermined ending value and said predetermined ending value, said predetermined heading value and the acknowledging number each have a different value not greater than 2 to the power m.

7. A data communications system comprising:

a sending device comprising a code table stored in memory, means for encoding each value of original data into a numeric code string using said coding table and means for transmitting encoded data;

a receiving device comprising a corresponding code table stored in memory, means for receiving encoded data and means for using the code table in the receiving device to decode received code strings to recover original data;

a data communication path connected between said means for transmitting and said means for receiving, said communication path including m parallel data transmission lines;

wherein each figure in each code string has a value not greater than 2 to the power m such that when expressed in binary, each figure comprises m bits, and adjacent figures in each code string have different numeric values.

8. A data communications system as in claim 7 wherein the code string for each possible value of original data begins with a predetermined heading value.

9. A data communications system as in claim 7 further comprising:

means in said receiving device for transmitting a specific numeric value not greater than 2 to the power m back to the sender to indicate readiness to receive;

means in the sending device for receiving the specific numeric value indicating that the receiving device is ready to receive; and a second data communication path connected between said means for transmitting a specific numeric value and said means for receiving said specific numeric value, said communication path including m parallel data transmission lines.

10. A system for data communication as in claim 8 further comprising:

means in said receiving device for transmitting a specific numeric value not greater than 2 to the power m back to the sender to indicate readiness to receive;

means in the sending device for receiving the specific numeric value indicating that the receiving device is ready to receive; and a second data communication path connected between said means for transmitting a specific numeric value and said means for receiving said specific numeric value, said communication path including m parallel data transmission lines;

wherein the specific value indicating readiness to receive is different from said predetermined heading value.

11. A method of transmitting data over m parallel data lines, comprising:

encoding values of original data into strings of code figures, wherein the maximum allowable value of any code figure is 2 to the power m, and in each string adjacent figures have different numeric values; and transmitting the code strings over the m parallel data lines.

12. A method of transmitting data as in claim 11 wherein the original data is in the form of 8 bit bytes and the value of m is 2.

13. A method of communicating data between a sending device and a receiving device via a plurality of m parallel data lines, said method comprising:
- encoding each value of original data into a string of numeric code figures, wherein the code string for each possible value of original data ends with a predetermined ending value and each figure in each code string has a value not greater than 2 to the power m such that when expressed in binary, each figure comprises m bits, and adjacent figures in each code string have different numeric values;
- transmitting each figure of encoded data from the sender to the receiver by simultaneously transmitting one of the m bits of each figure on each of the m parallel data lines;
- receiving the transmitted data on the m parallel data lines at the receiver; and
- decoding strings of code figures to recover the original data.

14. A method of communicating data as in claim 13 wherein the code string for each possible value of original data begins with a predetermined heading value and said predetermined heading value is different from said predetermined ending value.

15. A method of communicating data as in claim 14 further comprising:
- said receiver transmitting a specific numeric value not greater than 2 to the power of m back to the sender to indicate readiness to receiver, wherein the specific value indicating readiness to receive is different from both said predetermined heading value and said predetermined ending value.

16. A method of communicating data between a sending device and a receiving device via a plurality of m parallel data lines, said method comprising:
- encoding each value of original data into a string of numeric code figures, values of original data which occur frequently being encoded into assigned short code strings, wherein each figure in each code string has a value not greater than 2 to the power m such that when expressed in binary, each figure comprises m bits, and adjacent figures in each code string have different numeric values;
- transmitting each figure of encoded data from the sender to the receiver by simultaneously transmitting one of the m bits of each figure on each of the m parallel data lines;
- receiving the transmitted data on the m parallel data lines at the receiver; and
- decoding strings of code figures to recover the original data.

17. A method of communicating data as in claim 16 wherein no longer code string begins with figures corresponding to a valid short code string.

18. A data communicating system comprising:
- a sending device comprising a code table stored in memory, means for encoding each value of original data into a numeric code string using said coding table and means for transmitting encoded data;
- a receiving device comprising a corresponding code table stored in memory, means for receiving encoded data and means for using the code table in the receiving device to decode received code strings to recover original data;
- a data communication path connected between said means for transmitting and said means for receiving, said communication path including m parallel data transmission lines;
- wherein each figure in each code string has a value not greater than 2 to the power of m such that when expressed in binary, each figure comprises m bits, adjacent figures in each code string have different numeric values, and the code string for each possible value of original data ends with a predetermined ending value.

19. A data communications system as in claim 18 wherein the code string for each possible value of original data begins with a predetermined heading value and said predetermined heading value is different from said predetermined ending value.

20. A data communicating system as in claim 19 further comprising:
- means in said receiving device for transmitting a specific numeric value not greater than 2 to the power of m back to the sender to indicate readiness to receive;
- means in the sending device for receiving the specific numeric value indicating that the receiving device is ready to receive; and
- a second data communication path connected between said means for transmitting a specific numeric value and said means for receiving said specific numeric value, said second data communication path including m parallel data transmission lines;
- wherein the specific value indicating readiness to receive is different from both said predetermined heading value and said predetermined ending value.

* * * * *